United States Patent [19]

Hensley, Jr. et al.

[11] 4,456,699

[45] Jun. 26, 1984

[54] CATALYST AND SUPPORT, AND THEIR METHODS OF PREPARATION

[75] Inventors: Albert L. Hensley, Jr., Munster, Ind.; Leonard M. Quick, Naperville, Ill.

[73] Assignee: Standard Oil Company (Indiana), Chicago, Ill.

[21] Appl. No.: 485,308

[22] Filed: Apr. 15, 1983

Related U.S. Application Data

[62] Division of Ser. No. 274,553, Jun. 17, 1981, Pat. No. 4,395,328.

[51] Int. Cl.³ .............................................. B01J 27/14
[52] U.S. Cl. .................................... 502/208; 502/210; 502/213
[58] Field of Search ........................ 252/435, 437, 439

[56] References Cited

U.S. PATENT DOCUMENTS

| | | | |
|---|---|---|---|
| 2,890,162 | 6/1959 | Anderson, Jr. et al. | 208/46 |
| 3,898,155 | 8/1975 | Wilson | 208/216 PP |
| 3,900,430 | 8/1975 | Beaty | 208/216 PP X |
| 3,904,550 | 9/1975 | Pine | 252/437 |
| 3,928,176 | 12/1975 | Hamner et al. | 208/97 |
| 4,003,828 | 1/1977 | Eberly, Jr. | 208/217 X |
| 4,066,572 | 1/1978 | Choca | 252/437 |
| 4,080,311 | 3/1978 | Kehl | 252/437 |
| 4,102,822 | 7/1978 | Mulaskey | 208/254 H X |
| 4,158,621 | 6/1979 | Swift et al. | 252/437 |
| 4,210,560 | 7/1980 | Kehl | 252/437 |
| 4,225,421 | 9/1980 | Hensley, Jr. et al. | 208/216 PP |
| 4,228,036 | 10/1980 | Swift et al. | 252/437 |
| 4,233,184 | 11/1980 | Cull | 252/437 |
| 4,364,844 | 12/1982 | Umemura et al. | 252/435 |
| 4,376,067 | 3/1983 | Vogel et al. | 252/437 |
| 4,382,877 | 5/1983 | Kehl | 252/437 |
| 4,382,878 | 5/1983 | Kehl | 252/435 X |

FOREIGN PATENT DOCUMENTS 55958 7/1982 European Pat. Off. ............ 252/437

Primary Examiner—Delbert E. Gantz
Assistant Examiner—William G. Wright
Attorney, Agent, or Firm—James R. Henes; William T. McClain; William H. Magidson

[57] ABSTRACT

A catalyst support is prepared from a composite comprising alumina and one or more oxides of phosphorus by forming the composite into a shaped support material having at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å) and heating said shaped support material in the presence of steam at sufficient elevated temperature, steam pressure, and time period to increase the average pore diameter of said shaped support in the absence of any appreciable reduction in pore volume.

A catalyst is prepared by impregnating the steam-treated support with at least one hydrogenating metal.

The catalyst can be used suitably in hydrocarbon conversion processes, such as a process for the hydrodemetallization of a hydrocarbon stream containing asphaltenes and a substantial amount of metals.

26 Claims, 3 Drawing Figures

CATALYST AND SUPPORT, AND THEIR METHODS OF PREPARATION

This is a division, of application Ser. No. 274,553 now U.S. Pat. No. 4,395,328 filed June 17, 1981.

BACKGROUND OF THE INVENTION

It is widely known that various organometallic compounds and asphaltenes are present in petroleum crude oils and other heavy hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature removal from the particular reactor and replacement by new catalyst.

Catalysts comprising one or more metals selected from Group VIB and Group VIII of the Periodic Table of Elements, alumina, and oxides of phosphorus are known, which catalysts can be used for various hydrotreating, hydrocracking, and demetallization processes.

Hamner, et al., in U.S. Pat. No. 3,928,176, disclose the hydroconversion and hydrodenitrogenation of heavy hydrocarbon streams in a two-catalyst process. Each of the two catalysts comprises a hydrogenation component of a Group VIB metal and/or a Group VIII metal on a support, such as alumina, silica, zirconia, magnesia, boria, titania, ceria, and thoria. The preferred support for the first catalyst is alumina and is a large-pore support. The same support materials can be employed in the second catalyst; however, they are in admixture with aluminum phosphate. The second catalyst is a small-pore catalyst and always includes an aluminum phosphate component, preferably in concentrations ranging from about 30% to about 100%. Hamner, et al., teach that the preferred small-pore aluminum phosphate catalyst includes a combination of properties comprising at least about 90%, and preferably at least about 99%, of its total pore volume of absolute diameter within the range of about 1.5 nm (15 Angstrom units [Å]) to about 10.0 nm (100 Å), and less than about 5%, and preferably 2%, of its total pore volume of absolute diameter within the range of about 8.0 nm (80 Å) to about 15.0 nm (150 Å). The pore volume of this aluminum phosphate catalyst ranges from about 0.25 cc/gm to about 0.75 cc/gm. While the Hamner, et al., patent teaches a process which employs two catalysts, the second catalyst of which contains aluminum phosphate, it does not teach a catalyst having an average pore diameter that is greater than 12.5 nm (125 Å) and containing a high-surface area support comprising catalytically active alumina and one or more oxides of phosphorus.

Anderson, et al., in U.S. Pat. No. 2,890,162, teach that suitable additives may be used to promote pore size distribution growth and/or for acting as active catalytic components of the finished contact agents. This patent discloses that various metals, mixtures of metals, metal compounds or mixtures of metal compounds, or of one or more metals and one or more metal compounds are suitable as such additives. They disclose that the materials may or may not be in chemical combination with the porous solid on the surface thereof. They list phosphates as one of the suitable metallic agents for such purposes. They provide that such promoters are present in an amount of about 0.1 wt% to about 10 wt%, preferably 0.5 wt% to about 5 wt%, although amounts greater than that may be employed if desired. They teach that the catalysts of their invention are quite suitable for hydrocracking residua and other asphalt-containing materials to lower boiling distillates and oils. They do not suggest that such a catalyst would be suitable for the hydrodemetallization of heavy hydrocarbon streams.

Pine, in U.S. Pat. No. 3,904,550, discloses the preparation of alumina-aluminum phosphate catalyst support materials by reacting an aluminum alkoxide with an aqueous solution containing phosphate ions and their use in hydrocarbon conversion processes, such as catalytic cracking, hydrocracking, hydrofining, and reforming. He teaches the combination of his alumina-aluminum phosphate support with hydrogenation metals, for example, with 0 to 50wt%, usually 20 to 30 wt%, of any of the Group VIB and Group VIII metals for use in the desulfurization and denitrogenation of light and heavy petroleum fractions and with 0 to 60 wt%, usually 10 to 25 wt%, of any of materials known to promote hydrocracking reactions, which include, inter alia, nickel oxide, cobalt oxide, molybdenum oxide, tungsten oxide, and zeolites for use in hydrocracking. His alumina-aluminum phosphate support contains from 35 to 85 wt%, and preferably from 50 to 75 wt%, aluminum phosphate. He does not consider a catalyst for hydrodemetallization.

Long, et al., in U.S. Pat. No. 3,989,645, disclose two different catalyst compositions, each of which has a pore size distribution that is different from the pore size distribution of the other catalyst that is disclosed in the patent. Either catalyst comprises a hydrogenation component comprising a Group VIB metal or a Group VIII metal, or both, on a suitable porous refractory inorganic oxide. The inorganic oxide supports suitably comprise alumina, silica, zirconia, magnesia, boria, phosphate, titania, ceria, thoria, and the like. The preferred support is alumina. This patent presents several catalysts that have an alumina support and contain 1 wt% $P_2O_5$, the phosphorus having been introduced into the composites by means of phosphomolybdic acid. Either catalyst can contain from about 5 wt% to about 50 wt%, preferably about 15 wt% to about 25 wt%, Group VIB metal and about 1 wt% to about 12 wt%, preferably about 4 wt% to about 8 wt%, Group VIII metal. These catalysts can be used in hydroconversion processes, which include demetallization.

Kehl, in U.S. Pat. No. 4,080,311, discloses thermally stable amorphous composite precipitates containing aluminum phosphate and alumina and having a surface area of about 100 $m^2$/gm to about 200 $m^2$/gm and an average pore radius of 7.5 nm (75 Å) to 15.0 nm (150 Å). He teaches that such thermally stable composite precipitates contain from 10 to 60 mole % alumina and from 40 to 90 mole % aluminum phosphate. He indicates that the term "composite" is used to denote the new compositions which are not physical admixtures. He discloses that the alumina-aluminum phosphate composite precipitates are suitable for use in catalytic cracking or for use as catalyst supports in reactions such as hydrogenation wherein a hydrogenation metal or metals from Group VI and/or Group VIII are deposited on the surface of the alumina-aluminum phosphate.

Eberly, in U.S. Pat. No. 4,003,828, teaches that increased catalytic activity for demetallization of metal-contaminated hydrocarbon feedstocks is realized for catalysts containing phosphorus oxides. Eberly discloses that the phophorus oxide is present in an amount within the range of 1 to 6 wt%, preferably 1.1 to 5.5 wt%, expressed as $P_2O_5$ and based on the weight of alumina and phosphorus oxide (the support). Only Catalyst D in the examples contains a $P_2O_5$ content that is greater than 6 wt%. However, that catalyst contains as hydrogenation metals both cobalt and molybdenum and their combined amount, expressed as oxides, is at least 15 wt%. In addition, Catalyst D has a pore volume that is less than 0.7 cc/gm. Eberly suggests that the phosphorus promotes increased pore size.

Choca, in U.S. Pat. No. 4,066,572, considers a phospha-alumina compositions having a large pore diameter of at least 10 nm (100 Å) and a pore volume distribution with a minimum number of small pores, i.e., less than 30% of the total pore volume being in pores smaller than 10 nm (100 Å) in diameter. She discloses that such a composition may be used as catalyst supports for various combinations of cobalt, nickel, tungsten, and/or molybdenum for use in the desulfurization and denitrogenation and other hydrotreating processes of both light and heavy petroleum fractions, or in combination with zeolites for use in hydrocracking or catalytic cracking, or combined with noble metals for reforming. She indicates that the average pore diameter increases with the amount of phosphorus introduced into the composition in its preparation and that total pore volume decreases with increasing amounts of phosphorus. In Example V, she furnishes a catalyst that contains 8 wt% $P_2O_5$ and was prepared to contain 14 wt% $MoO_3$ and 3 wt% CoO, which catalyst was employed as a catalyst for the hydrodesulfurization of a heavy vacuum gas oil.

Choca, et al., in U.S. Pat. No. 4,132,669, disclose phosphorus-containing catalysts that are prepared by using polycarboxylic acids, such as citric acid, as extrusion aids. They indicate that the phospha-alumina powders of the invention generally comprise anywhere from 3 wt% to 30 wt% $P_2O_5$. In addition, they disclose that the support material can be impregnated with catalytically active metals, such as cobalt, nickel, molybdenum, and tungsten and suggest in the introduction of the patent that alumina-phosphorus materials are useful for hydrotreating catalysts, hydrocracking catalysts, demetallization catalysts, and the like.

Cull, in U.S. Pat. No. 4,233,184, discloses a high-surface area aluminum phosphate-alumina product that is a suitable catalyst support and that is prepared by reacting a mixture comprising aluminum alkoxide and an organic phosphate in the presence of moist air to form a precipitate, separating the precipitate from the mixture, and drying and calcining the precipitate. Although steam is present during the preparation of the precipitate, there is no disclosure of the heating of the product in the presence of steam to increase the average pore diameter of the product in the absence of any appreciable reduction in pore volume.

In U.S. patent application Ser. No. 946,499, Hopkins, et al., disclose a process for the hydrometallization of a hydrocarbon feedstock containing asphaltenes and a substantial amount of metals, which process employs a catalyst comprising a small amount of a hydrogenation component comprising at least one active original hydrogenation metal deposed on a large-pore, high-surface area support comprising catalytically active alumina and one or more oxides of phosphorus, said phosphorus being present in an amount that is greater than 6 wt%, calculated as $P_2O_5$ and based upon the weight of the support. There is no discussion directed to the steaming of such a catalyst or to the use of a steamed catalyst.

Steam treatment can be used to control or improve the performance of a catalytic material. For example, catalysts are often steam deactivated in preparation for testing. An example of this is presented by Michalko in U.S. Pat. No. 3,531,397, in column 7, at lines 62 through 73.

It is well known in the art that catalysts can be treated with steam for the purpose of improving catalytic properties and performance. For example, Plank, et al., in U.S. Pat. No. 3,140,253, at column 12, lines 3 through 16, consider a preliminary steam treatment of cracking catalysts comprising crystalline aluminosilicates at temperatures within the range of 427° C. (800° F.) to about 816° C. (1,500° F.) to provide improved selectivity and other beneficial properties. O'Keefe, et al., in U.S. Pat. No. 3,668,114, provides a method for improving the attrition resistance and heat stability of a silica-alumina catalytic cracking catalyst wherein the catalyst can contain up to 35 wt % alumina, which method comprises treating the catalyst with steam of a temperature within the range of about 482° C. (900° F.) to abut 816° C. (1500° F.) for at least ½ hour under a steam pressure of about 1 to 25 atmospheres. In U.S. Pat. No. 3,530,065, Leaman, et al., consider the cracking of hydrocarbons in the presence of a siliceous conversion catalyst including a catalyst selected from amorphous siliceous catalysts and those containing a minor or major portion of a material comprising a catalytically active crystalline aluminosilicate and in column 2, at lines 55 through 65, indicate that a preliminary steam treatment of such catalysts will achieve a desired stabilization of catalyst activity and selectivity. In the U.S. Pat. No. 3,382,189, Mitchell, et al., disclose the heat treatment of fluidizable particles of a silica-alumina catalyst first in a moisture-free atmosphere and then in a substantially oxygen-free steam-rich atmosphere when the temperature of the particles is above a temperature at which steam condensation will take place in order to provide a material that has improved activity, selectivity, and resistance to deactivation by temperature and steam. In the U.S. Pat. No. 3,933,621, White, et al., disclose the steaming of silica-alumina catalysts at a temperature of 1,400° F. to provide improved cracking catalysts.

Chessmore, et al., in U.S. Pat. No. 4,199,435, teach the steam treatment of a metallic carbon monoxide combustion-promoting catalyst prior to its use with a fluidized cracking catalyst in a catalytic cracking regeneration operation to decrease the amount of $NO_x$ formed during regeneration of the cracking catalyst that is present with the combustion-promoting catalyst. Such combustion-promoting catalyst comprises one or more combustion-promoting metals, such as platinum, palladium, iridium, rhodium, osmium, ruthenium, rhenium, and copper, associated with a particulate solid inorganic oxide, such as silica, alumina, silica-alumina, silica-magnesia, or a zeolite-containing material. Such steaming is carried but at a temperature of 760° C. (1,400° F.) to 1,100° C. (2,012° F.) and a steam pressure of 1 to 15 atmospheres for a period of 2 to 100 hours.

Kearby, in column 12, at lines 4 through 10, of U.S. Pat. No. 3,342,750, in considering the preparation of high-surface area aluminum phosphate gels, discloses that the high-temperature steaming of such a gel does not decrease the surface area of the gel to as great an extent as does water impregnation of the gel. There is no indication as to how pore volume or average pore diameter are affected by such steaming.

While the art has suggested that various catalytic materials can be steamed for various purposes, there has been no disclosure of the use of steam to increase the average pore diameter of a composite of alumina and one or more oxides of phosphorus in the absence of decreasing appreciably the pore volume of the composite.

Now it has been found that the treating of a composite of alumina and one or more oxides of phosphorus with steam at an elevated temperature will provide a catalytic material that has increased pore size without an appreciable change in pore volume and is useful for making a demetallization catalyst having improved activity maintenance.

Not one of the above-discussed patents discloses the steam-treatment of a composite of alumina and one or more oxides of phosphorus wherein the pore size of the composite is increased without an accompanying appreciable reduction in pore volume.

SUMMARY OF THE INVENTION

Broadly, according to the present invention, there is provided a method for preparing an improved catalyst support from a composite comprising alumina and one or more oxides of phosphorus, which method comprises forming said composite into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å) and heating said shaped catalyst support material in the presence of steam at sufficient elevated temperature, steam pressure, and time period to increase the average pore diameter of said shaped catalyst support material in the absence of any appreciable reduction in pore volume. Typically, the temperature employed during said treatment is in the range of about 704° C. (1,300° F.) to about 927° C. (1,700° F.) and the steam pressure is within the range of about 30 kPa (4.4 psia) to about 274 kPa (25 psig). The aforesaid composite is a composite comprising alumina and one or more oxides of phosphorus, said oxides of phosphorus being present in an amount within the range of about 5 wt% to about 20 wt%, calculated as $P_2O_5$ and based upon the weight of said composite.

There is also provided a method for preparing an improved catalytic composition, which method comprises forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with at least one hydrogenating metal.

In addition, there are provided a catalyst support material and a catalytic composition, each of which is prepared by the above respective methods of preparation, and a process for the conversion of a heavy hydrocarbon stream containing asphaltenes and a substantial amount of metals, which process comprises contacting said stream under suitable conditions and in the presence of hydrogen with the catalytic composition of the present invention. An embodiment of such conversion process is a hydrodemetallization process.

BRIEF DESCRIPTION OF ACCOMPANYING DRAWINGS

The accompanying FIG. 1 presents a simplified flow diagram of a preferred embodiment of the process of the present invention.

The accompanying FIG. 2 compares the performances of two catalysts prepared according to the method of the present invention with their counterpart catalysts having non-steamed supports comprising alumina and one or more oxides of phosphorus and with a prior-art catalyst having a non-steamed alumina support, the comparisons being based upon the catalysts' abilities to hydrodemetallize an Ardeshir vacuum resid.

The accompanying FIG. 3 compares the performance of an embodiment of the catalyst of the present invention to that of a commercially-available catalyst containing 8.5 wt% $P_2O_5$, when hydrodemetallizing an Ardeshir vacuum resid.

DETAILED DESCRIPTION OF THE INVENTION

Figure 1:
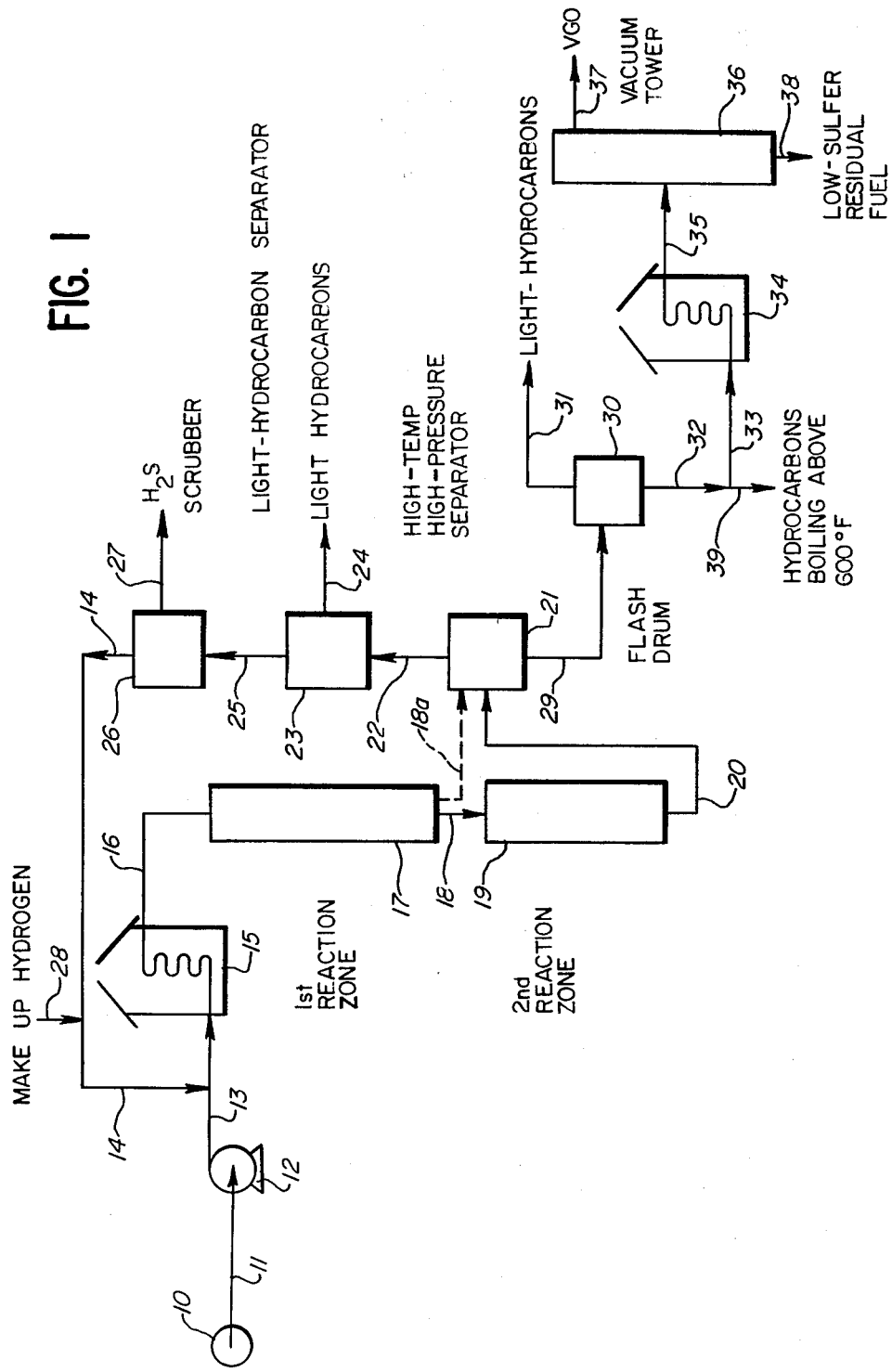

The present invention includes a method for preparing an improved catalyst support, which comprises alumina and one or more oxides of phosphorus; the support; a method for preparing an improved catalyst suitable for the hydrodemetallization of heavy hydrocarbon streams and residua, which catalyst comprises one or more hydrogenating metals and the aforesaid improved catalyst support; the catalyst resulting from the aforesaid method for preparing an improved catalyst; and a hydrocarbon conversion process, e.g., a hydrodemetallization process, employing the aforesaid improved catalyst.

Broadly, according to the present invention, there is provided a method for preparing an improved catalyst support from a composite comprising alumina and one or more oxides of phosphorus, which method comprises forming said composite into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å) and heating said shaped catalyst support material in the presence of steam at sufficient elevated temperature, steam pressure, and time period to increase the average pore diameter of said shaped catalyst support material in the absence of any appreciable reduction in pore volume. It is contemplated that a reduction in pore volume that is greater than 0.1 cc/gm is an appreciable reduction.

The support material comprises alumina and one or more oxides of phosphorus, said oxides of phosphorus being present in an amount within the range of about 5 wt% to about 20 wt%, calculated as $P_2O_5$ and based upon the weight of the support material. Preferably, the phosphorus is present in an amount within the range of about 6 wt% to about 15 wt% and, more preferably, within the range of about 6 wt% to about 11 wt%, each amount being calculated as $P_2O_5$ and based upon the weight of said support material.

The support material can contain a minor amount of an additional refractory inorganic oxide. For example, it can contain about 0.5 wt% to about 6 wt% silica, based upon the weight of the support.

Suitable catalytic support precursors comprising alumina and one or more oxides of phosphorus can be conveniently purchased from catalyst manufacturers, e.g., Katalco Corporation. Alternatively, the support material can be prepared by methods well known to those skilled in the art. For example, a solution of an aluminum salt, such as aluminum sulfate, is combined with a solution of sodium aluminate with accompanying rapid stirring; the pH of the resulting alumina slurry is adjusted to a value of about 7.5 by means of the addition of a dilute acid, such as dilute sulfuric acid; the resulting mixture is heated to a temperature within the range of about 20° C. (68° F.) to about 100° C. (212° F.); the resulting alumina slurry is filtered and washed with distilled water, the washed alumina slurry is combined with a source of phosphorus, such as phosphoric acid; and the resulting mixture is thoroughly blended, dried, and calcined. Hence, a gel of the alumina and one or more oxides of phosphorus can be prepared, washed with water to remove soluble inorganic salts, dried, formed into appropriate shapes such as extrudates or spheres, and calcined, if desired.

Other typical sources of phosphorus are orthophosphoric acid, ammonium dihydrogen phosphate monobasic, sodium phosphate, and ammonium phosphate.

Other methods of preparation are presented in the art, for example, see U.S. Pat. Nos. 3,904,550; 4,003,828; 4,066,572; and 4,132,669.

In any event, the shaped catalyst support material that is to be treated according to the method of preparation of the present invention should have at least 0.8 cc/gm of its pore volume in pores having diameters of 0 nm (0 Å) to 120 nm (1,200 Å) as measured by nitrogen absorption and at least 0.1 cc/gm of its pore volume in pores having diameters of 120 nm (1,200 Å) to 5,000 nm (50,000 Å) as measured by mercury penetration.

The catalyst support material can be shaped into selected shapes by methods that are known in the art to form shaped catalyst particles having macropores. For example, such shapes can be spheres, pellets, or extrudates. Other shapes are described by Hoekstra, et al., in U.S. Pat. No. 3,764,565.

Suitably, according to the present invention, a pre-shaped catalyst support material comprising a composite comprising alumina and one or more oxides of phosphorus is heated in the presence of steam at sufficient elevated temperature, steam pressure, and time period to increase the average pore diameter of the shaped catalyst support material in the absence of any appreciable reduction in pore volume. Conveniently, the steam is employed at a pressure within the range of about 30 kPa (4.4 psia) to about 274 kPa (25 psig). The time during which the support material is contacted with the steam is within the range of about 15 minutes to about 3 hours, preferably within the range of about 30 minutes to about 2 hours. The elevated temperature at which the steam treatment is conducted is within the range of about 704° C. (1,300° F.) to about 927° C. (1,700° F.), preferably within the range of about 760° C. (1,400° F.) to about 871° C. (1,600° F.). While specific combinations of values for these steaming conditions are not provided, any combination that will provide an increase in the average pore diameter without any appreciable change in pore volume is suitable.

The support material can be dried and/or calcined, if desired. Drying can be conducted in air at a temperature within the range of ambient temperature to about 204° C. (400° F.) for a period of 1 to 70 hours. Typically, the calcination can be carried out in air at a temperature of about 427° C. (800° F.) to about 649° C. (1,200° F.) for a period of about 0.5 hour to 8 hours.

The above-described treatment is performed in order to obtain an average pore diameter that is at least 18 nm (180 Å), calculated as discussed hereinbelow. In order to provide such an average pore diameter, it is contemplated that, if the surface area of the non-steamed support material is 200 m²/gm or above, the treatment must be able to reduce the surface area to a value below 200 m²/gm. Of course, the surface area of the non-steamed support material can be below 200 m²/gm. However, if it is not below such value, it must be reduced to that level during steaming in order to promote the suitable average pore diameter.

There is also provided, according to the present invention, a catalyst support. This support, which is prepared by the method described hereinabove, has a surface area that is less than 200 m²/gm, a pore volume wherein at least 0.8 cc/gm thereof is in pores having diameters within the range of 0 nm (0 Å) to 120 nm (1,200 Å) and at least 0.1 cc/gm thereof is in pores having diameters within the range of 120 nm (1,200 Å) to 5,000 nm (50,000 Å), and an average pore diameter that is at least 18 nm (180 Å). Typically, the surface area is within the range of about 140 m²/gm to about 190 m²/gm, the pore volume that has pore diameters within the range of 0 nm (0 Å) to 120 nm (1,200 Å) is within the range of 0.8 cc/gm to about 1.5 cc/gm, the pore volume that has pore diameters within the range of 120 nm (1,200 Å) to 5,000 nm (50,000 Å) is within the range of 0.1 cc/gm to about 0.5 cc/gm, and the average pore diameter is within the range of about 18 nm (180 Å) to about 35 nm (350 Å).

It is to be understood that as used herein all values that are given for surface area would be those that are obtained by the BET nitrogen adsorption method; values that are given for pore volume would be those that are obtained by nitrogen adsorption plus mercury penetration for those values that are related to pore diameters that are above 120 nm (1,200 Å); and all values that are given for average pore diameter would be those that are calculated by means of the expression:

$$A.P.D. = (4 \times P.V. \times 10^4 / S.A.),$$

wherein
A.P.D. = average pore diameter in Å,
P.V. = pore volume in cc/gm, and
S.A. = surface area in m²/gm.

This method of determining average pore diameter is discussed by F. C. Ciapetta and D. S. Henderson in an article in OIL & GAS JOURNAL, Vol. 65, page 88 (1967).

Typical pore size distributions of the support material are shown hereinbelow in Table I.

TABLE I

PORE SIZE DISTRIBUTIONS OF CATALYST SUPPORT

| Pore Diameter, nm (Å) | % of Pore Volume |
|---|---|
| 0–10 (0–100) | 5–15 |
| 10–20 (100–200) | 15–40 |
| 20–120 (200–1,200) | 40–70 |
| 120–5,000 (1,200–50,000) | 10–20 |

These pore size distributions were obtained with steam-treated support material by a Digisorb 2500 instrument through the use of nitrogen desorption and mercury penetration techniques. Those skilled in the art will recognize that there may be pores too small to be detected by nitrogen desorption.

Accordingly, there is provided a catalyst support which comprises alumina and one or more oxides of phosphorus and which is prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å) and heating said shaped catalyst support material in the presence of steam at sufficient elevated temperature, steam pressure, and time period to increase the average pore diameter of said shaped catalyst support material in the absence of any appreciable reduction in pore volume.

According to the present invention, there is provided a method for preparing a catalytic composition, which method comprises forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with at least one hydrogenating metal. Therefore, the method for preparing the catalyst composition comprises making the catalyst support as described hereinabove and subsequently impregnating that support with the desired hydrogenating metal or metals. One or more solutions containing a heat-decomposable compound of the metal or heat-decomposable compounds of the metals are used in the impregnation.

It is not understood at this time how the phosphorus exists in the catalytic support material or the finished catalytic composite. It may be present as aluminum phosphate, or as a combination of aluminum phosphate in admixture with alumina, or it may be present as one or more oxides of phosphorus, or as an oxide and/or other compound of phosphorus. In any event, the term "one or more oxides of phosphorus" is used in this specification and the associated claims to designate any one of the above situations.

The catalyst of the present invention can be prepared by the typical commercially available method of impregnating an appropriate support with a solution containing a heat-decomposable compound of the metal to be placed on the catalyst, drying, and calcining the impregnated material. The drying and calcining are conducted as described hereinabove. Water is a typical solvent for the impregnation solution. The support may have been calcined prior to the impregnation. Impregnation techniques are well known to those skilled in the art.

Suitable hydrogenating metal or metals are conveniently selected from the group consisting of vanadium, metals of Group VIB of the Periodic Table of Elements, and metals of Group VIII of the Periodic Table of Elements. Therefore, the hydrogenating component of the catalyst of the present invention is a component which comprises at least one hydrogenating metal selected from the group consisting of vanadium, metals of Group VIB of the Periodic Table of Elements, and metals of Group VIII of the Periodic Table of Elements. The Periodic Table of Elements referred to herein is found on page 628 of WEBSTER'S SEVENTH NEW COLLEGIATE DICTIONARY, G. & C. Merriam Company, Springfield, Mass., U.S.A. (1965). A preferred metal from Group VIB is molybdenum, while a preferred metal from Group VIII is nickel, cobalt, or iron. Appropriate heat-decomposable compounds of such metals are the nitrates and chlorides. Metals of Group VIB, when present in the finished catalyst are there in an amount within the range of about 0.5 wt% to about 20 wt%, calculated as the oxide and based upon the total catalyst weight, while metals of Group VIII, if present, are there in an amount within the range of about 0.5 wt% to about 7 wt%, calculated as the oxide and based upon the weight of the catalyst. Vanadium, if present, is there in an amount within the range of about 4 wt% to about 10 wt%, calculated as the oxide and based upon the weight of the catalyst. Although it is contemplated that the hydrogenating component can comprise more than one metal, preferably only a single hydrogenating metal is employed in the catalyst and, preferably, such metal is present in an amount that does not exceed 5 wt%, calculated as the oxide and based upon the total catalyst weight. The impregnation of only a small amount of the hydrogenating metal or metals will not appreciably affect the physical properties of the support.

If desired, the catalyst, prior to use, can be presulfided by methods known to those skilled in the art.

The catalyst can be employed in the form of a fixed bed or an ebullating bed of particles. In the case of a fixed bed, the particulate material should have a particle size of at least 0.8 mm (1/32 in) and can be in the form of extrudates, pellets, or spheres. In the case of an ebullating bed, the particles should have a size within the range of about 0.2 mm (0.008 in) to about 6 mm (0.25 in).

The bulk density of the catalyst is within the range of about 0.3 gm/cc to about 0.55 gm/cc.

In view of the above, there is also provided, according to the present invention, a catalyst. Broadly, this catalyst comprises a hydrogenating component comprising at least one hydrogenating metal and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

According to the present invention, there is provided a process for the conversion of a hydrocarbon stream containing asphaltenes and a substantial amount of metals, which process comprises contacting said stream under suitable conditions and in the presence of hydrogen with a catalyst comprising a hydrogenating component comprising at least one hydrogenating metal and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

The term "substantial amount of metals" as used herein refers to any amount that is 30 ppm or greater and could be as large as 1,000 ppm or more.

In one embodiment of this process for the conversion of a hydrocarbon stream containing asphaltenes and a substantial amount of metals, the catalyst is present in one or more fixed beds. In another embodiment, the catalyst is present in one or more ebullating beds.

Therefore, in one embodiment there is provided a process for the conversion of a hydrocarbon stream containing asphaltenes and a substantial amount of metals, which process comprises contacting said stream under suitable conditions and in the presence of hydrogen with a catalyst, said catalyst being present in one or more fixed beds and comprising a hydrogenating component comprising at least one hydrogenating metal selected from the group consisting of vanadium, metals of Group VIB of the Periodic Table of Elements, and metals of Group VIII of the Periodic Table of Elements and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

In another embodiment of the process of the present invention, there is provided a process for the conversion of a hydrocarbon stream containing asphaltenes and a substantial amount of metals, which process comprises contacting said stream under suitable conditions and in the presence of hydrogen with a catalyst, said catalyst being present in one or more ebullating beds and comprising a hydrogenating component comprising at least one hydrogenating metal selected from the group consisting of vanadium, metals of Group VIB of the Periodic Table of Elements, and metals of Group VIII of the periodic Table of Elements and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

There is provided further, according to the present invention, a process for the hydrodemetallization of a hydrocarbon stream containing asphaltenes and a substantial amount of metals, which process comprises contacting said stream in the presence of hydrogen and under hydrodemetallization conditions with a catalyst comprising a hydrogenating component comprising at least one hydrogenating metal and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

In one embodiment, there is provided a process for the hydrodemetallization of a hydrocarbon stream containing asphaltenes and a substantial amount of metals, wherein said catalyst is present in one or more ebullating beds. In another embodiment, there is provided a process for the hydrodemetallization of a hydrocarbon stream containing asphaltenes and a substantial amount of metals, wherein said catalyst is present in one or more fixed beds.

In view of the above, there is provided a process for the hydrodemetallization of a hydrocarbon stream containing asphaltenes and a substantial amount of metals, which process comprises contacting said stream in the presence of hydrogen and under hydrodemetallization conditions with a catalyst, said catalyst being present in one or more fixed beds and comprising a hydrogenating component comprising at least one hydrogenating metal selected from the group consisting of vanadium, metals of Group VIB of the Periodic Table of Elements, and metals of Group VIII of the Periodic Table of Elements and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

In addition, there is provided a process for the hydrodemetallization of a hydrocarbon stream containing asphaltenes and a substantial amount of metals, which process comprises contacting said stream in the presence of hydrogen and under hydrodemetallization conditions with a catalyst, said catalyst being present in one or more ebullating beds and comprising a hydrogenating component comprising at least one hydrogenating metal selected from the group consisting of vanadium, metals of Group VIB of the Periodic Table of Elements, and metals of Group VIII of the Periodic Table of Elements and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, and subsequently impregnating said steam-treated support material with said at least one hydrogenating metal.

The catalyst and process of the present invention are useful for the hydrometallization of hydrocarbon streams and are particularly useful for the hydrodemetallization of hydrocarbon streams containing asphaltenes and a substantial amount of metals. They can be employed suitably to hydrodemetallize crude oils, topped crude oils, petroleum hydrocarbon residua, both atmospheric resids and vacuum resids, oils obtained from tar sands, residua derived from tar sand oil, and hydrocarbon streams derived from coal or oil shale.

Suitable operating conditions for this hydrodemetallization process comprise an average catalyst bed temperature of about 371° C. (700° F.) to about 482° C. (900° F.), a total pressure of about 3.55 MPa (500 psig) to about 41.5 MPa (6,000 psig), a hydrogen partial pressure of about 3.45 MPa (500 psia) to about 20.7 MPa (3,000 psia), a hydrogen flow rate or hydrogen addition rate of about 178 m³/m³ (1,000 SCFB) to about 1,780 m³/m³ (10,000 SCFB), [Gas volumes are measured at 15.6° C. and 101.3 kPa.] and a liquid hourly space velocity (LHSV) of about 0.2 volume of hydrocarbon per hour per volume of catalyst to about 2.5 volumes of hydrocarbon per hour per volume of catalyst. Preferably, the operating conditions comprise an average catalyst bed temperature of about 388° C. (730° F.) to about 432° C. (810° F.), a total pressure of about 8.4 MPa (1,200 psig) to about 20.8 MPa (3,000 psig), a hydrogen partial pressure of about 8.3 MPa (1,200 psia) to about 13.8 MPa (2,000 psia), a hydrogen flow rate or hydrogen addition rate of about 712 m³/m³ (4,000 SCFB) to about 1,424 m³/m³ (8,000 SCFB), and a LHSV of about 0.4 volume of hydrocarbon per hour per volume of catalyst to about 2.0 volumes of hydrocarbon per hour per volume of catalyst.

A preferred embodiment of the process of the present invention is presented in the accompanying FIG. 1, which is a simplified flow diagram and does not show various pieces of auxiliary equipment, such as pumps, compressors, heat exchangers, and valves. Since one having ordinary skill in the art would recognize easily the need for and location of such auxiliary equipment, its omission is appropriate and facilitates the simplification of the figure. This process scheme is presented for the purpose of illustration only and is not intended to limit the scope of the present invention.

Referring to FIG. 1, an Ardeshir vacuum residual oil, containing about 5.4 wt% sulfur, about 0.6 wt% nitrogen, and about 330 ppm of nickel plus vanadium, is withdrawn from source 10 through line 11 and pumped by pump 12 through line 13. A hydrogen-containing recycle gas stream, discussed hereinafter, is passed from line 14 into line 13 to be mixed with the hydrocarbon feed stream to form a mixed hydrogen-hydrocarbon stream. The mixed hydrogen-hydrocarbon stream is then passed from line 13 into furnace 15, where it is heated to a temperature within the range of about 399° C. (750° F.) to about 421° C. (790° F.). The heated stream is then passed through line 16 into reaction zone 17.

Reaction zone 17 comprises one or more reactors, each of which contains one or more fixed beds of catalyst. The catalyst comprises a hydrogenation component consisting essentially of about 4 wt% molybdenum, calculated as $MoO_3$ and based upon the total catalyst weight, deposed on a support comprising alumina and oxides of phosphorus, the amount of said oxides of phosphorus being about 7.8 wt%, calculated as $P_2O_5$, and the catalyst having been prepared according to the present invention.

The operating conditions employed in reaction zone 17 comprise a total pressure of about 11.8 MPa (1,700 psig) to about 13.2 MPa (1,900 psig), a hydrogen partial pressure of about 11.0 MPa (1,600 psia) to about 12.8 MPa (1,850 psia), an average catalyst bed temperature within the range of about 399° C. (750° F.) to about 421° C. (790° F.); a LHSV within the range of about 0.9 volume of hydrocarbon per hour per volume of catalyst to about 1.1 volumes of hydrocarbon per hour per volume of catalyst; and a hydrogen recycle rate within the range of about 1,120 $m^3/m^3$ (6,300 SCFB) to about 1,230 $m^3/m^3$ (6,900 SCFB).

The effluent from reaction zone 17 is passed through line 18 into a second reaction zone 19 containing a suitable resid desulfurization catalyst. Such a catalyst is a catalyst comprising about 10 wt% $MoO_3$ on a large-pore, high-surface area alumina having a surface area of 190 $m^2/gm$ and an average pore diameter of 12.0 nm (120 Å). Operating conditions employed in reaction zone 19 include an average catalyst bed temperature of 371° C. (700° F.) to about 416° C. (780° F.); a LHSV within the range of about 0.4 volume of hydrocarbon per hour per volume of catalyst to about 1.5 volumes of hydrocarbon per hour per volume of catalyst; a pressure of about 11.7 MPa (1,685 psig) to about 13.2 MPa (1,900 psig); and a hydrogen recycle rate of about 1,120 $m^3/m^3$ (6,300 SCFB) to about 1,230 $m^3/m^3$ (6,900 SCFB). The effluent from reaction zone 19 is passed through line 20 into high-temperature, high-pressure, gas-liquid separator 21, which is operated at reactor pressure and temperature. In separator 21, the hydrogen-containing gas is separated from the rest of the effluent. The hydrogen-containing gas is passed from separator 21 through line 22. It is cooled and sent into light-hydrocarbon separator 23, wherein the condensed light hydrocarbons are separated from the hydrogen-containing gas and withdrawn via line 24. The hydrogen-containing gas is removed by way of line 25 and passed into scrubber 26, wherein the hydrogen sulfide is removed or scrubbed from the gas. The hydrogen sulfide is removed from the system by way of line 27. The scrubbed hydrogen-containing gas is then passed through line 14, where it can be joined by make-up hydrogen, if necessary, via line 28. The hydrogen-containing gas stream is then added to the hydrocarbon feed stream in line 13, as described hereinabove.

The liquid portion of the effluent is passed from the high-temperature, high-pressure, gas-liquid separator 21 by way of line 29 to high-temperature flash drum 30. In flash drum 30, the pressure is reduced to atmospheric pressure and the temperature of the material is within the range of about 371° C. (700° F.) to about 427° C. (800° F.). In flash drum 30, the light hydrocarbons containing not only the naphtha but those distillates boiling up to a temperature of about 288° C. (550° F.) to 316° C. (600° F.), such as fuel oil, are flashed from the rest of the product and are removed from the system by way of line 31. Such light hydrocarbons can be separated into their various components and sent to storage or to other processing units.

The heavier material that is separated from the light hydrocarbons, that is, material that boils at a temperature above about 316° C. (600° F.), present in an amount of about 30 wt% to about 70 wt% based upon the hydrocarbon feed, is removed from flash drum 30 by way of line 32 for use as feeds to other processes. Such liquid material contains about 0.2 wt% to about 1 wt% sulfur, about 2 wt% to about 4 wt% asphaltenes, and about 10 ppm to about 60 ppm nickel plus vanadium.

This liquid effluent is passed via line 33 to furnace 34, or other suitable heating means, to be heated to a temperature as high as 427° C. (800° F.)

The heated stream from furnace 34 is passed by way of line 35 into vacuum tower 36, where vacuum gas oil (VGO) is separated from a low-sulfur residual fuel. The VGO is passed from vacuum tower 36 by way of line 37 to storage or to a conventional catalytic cracking unit (not shown). The low-sulfur residual fuel is passed from vacuum tower 36 by way of line 38 to storage or to other processing units where it can be used as a source of energy.

Alternatively, the material boiling above 316° C. (600° F.) that is removed from flash drum 30 through line 32 can be sent by way of line 39 to a resid catalytic cracking unit (not shown).

Alternatively, the effluent from reaction zone 17 can be sent through line 18a directly to high-temperature, high-pressure separator 21 and the demetallized liquid effluent from high-temperature, high-pressure separator 21 can be sent to storage or to other processing units.

The following examples are presented to facilitate a better understanding of the present invention. They are presented for the purpose of illustration only and are not intended to limit the scope of the present invention.

EXAMPLE I

Four catalysts were prepared in the laboratory as described hereinafter. Each of the laboratory preparations involved adding an aqueous solution of ammonium molybdate, $(NH_4)_6Mo_7O_{24}.4H_2O$, to the support material, thoroughly mixing the composite, permitting the resulting mixture to stand for a period of time as designated hereinafter, drying the material under a heat lamp, and calcining the dried material in air for 2 hr at a temperature of 1,000° F. (538° C.). Important preparation information and properties are presented in Table II hereinbeflow. Two of the catalysts, namely, Catalysts Nos. 1 and 4, were prepared with untreated supports, while two of the catalysts, namely Catalysts Nos. 2 and 3, were prepared with steamed supports. The support materials before steaming were obtained from Katalco Corporation and were prepared to contain from about 8 wt% to about 10 wt% oxides of phosphorus, calculated as $P_2O_5$. Catalyst No. 2 contained the steamed support that was prepared from the non-steamed support of Catalyst No. 1, while Catalyst No. 3 contained the steamed support that was prepared from the non-steamed support of Catalyst No. 4.

The steaming in each case was performed at a temperature of approximately 816° C. (1,500° F.) for 30 minutes at a steam pressure of 0.8 atm. The catalyst support material to be steamed was placed in a 3.8-cm (1.5-in) inside diameter quartz tube that was held in a vertical position within a tube furnace. A mixture of steam and nitrogen (approximately 80 volume % steam) was controlled by operating needle valves and was measured by flow meters. The steam-nitrogen mixture was introduced into the bottom of the quartz tube and flow was adjusted to be maintained at a rate of about 200 cc/min. The support material was rapidly heated to the temperature desired. After the appropriate temperature was obtaind, the steam-nitrogen gas stream was permitted to pass through the support material bed for the time desired. At the end of the steaming step, the steam flow was stopped while nitrogen flow was continued. The steamed material was rapidly cooled by turning off the furnace and removing the quartz tube from the furnace while nitrogen flow was maintained.

TABLE II

CATALYST DATA

| Catalyst No. | 1 | 2 | 3 | 4 |
|---|---|---|---|---|
| Support No. | 1 | 1 | 2 | 2 |
| Support Wt., gm | 229.4 | 187 | 1,056 | 192 |
| Impregnation Sol'n. Prepared With: | | | | |
| $(NH_4)_6Mo_7O_{24}\cdot 4H_2O$, gm | 11.7 | 9.5 | 54.0 | 9.8 |
| distilled water, ml | 400 | 350 | 2,000 | 250 |
| Standing Time During Impregnation, hr. | 16 | 16 | 2 | — |
| Support Steamed | | X | X | |
| $MoO_3$/Support, gm/gm | 0.04 | 0.04 | 0.04 | 0.04 |
| Support Properties: | | | | |
| Surface Area, m²/gm | 219 | 179 | 173 | 232 |
| Pore Vol., cc/gm | 1.433 | 1.427 | 1.108 | 1.172 |
| Calc. A.P.D., nm | 26.1 | 31.9 | 25.6 | 20.2 |
| Å | 261 | 319 | 256 | 202 |
| % of P.V. in Pores of Diam. in nm (Å): | | | | |
| 0–10 (0–100) | 13.8 | 7.7 | 14.1 | 25.4 |
| 10–20 (100–200) | 25.2 | 22.7 | 29.6 | 36.5 |
| 20–120 (200–1,200) | 51.5 | 59.6 | 39.0 | 26.7 |
| 120–5,000 (1,200–50,000) | 9.5 | 10.0 | 17.3 | 11.4 |
| Catalyst Properties: | | | | |
| Surface Area, m²/gm | | 162 | | 217 |
| Pore Vol., cc/gm | | 1.382 | | 1.131 |
| Calc. A.P.D., nm | | 34.1 | | 20.9 |
| Å | | 341 | | 209 |
| % of P.V. in Pores of Diam. in nm (Å): | | | | |
| 0–10 (0–100) | | 6.7 | | 22.8 |
| 10–20 (100–200) | | 16.7 | | 33.8 |
| 20–120 (200–1,200) | | 67.2 | | 30.2 |
| 120–5,000 (1,200–50,000) | | 9.4 | | 13.2 |

Catalysts Nos. 1 and 2 were prepared in the form of 0.070-cm (1/32-in) extrudates while Catalysts Nos. 3 and 4 were prepared as 0.1-cm (1/25-in) spheres.

A fifth catalyst, identified hereinafter as Catalyst No. 5 and containing 1 wt% $MoO_3$ on a catalytically-active alumina, was obtained from the American Cyanamid Company. This catalyst, which was obtained in the form of 0.079-cm (1/32-in) extrudates, had a BET surface area of 187 m²/gm, a pore volume of 1.042 cc/gm, and an average pore diameter of 22.2 nm (222 Å). Its pore size distribution provided 17.7% of the pore volume in 0–10 nm (0–100 521 ) pores, 45.5% of the pore volume in 10–20 nm (100–200 Å) pores, 20.6% of the pore volume in 20–120 nm (200–1,200 Å) pores, and 16.2% of the pore volume in 120–5,000 nm (1,200–50,000 Å) pores.

EXAMPLE II

For testing, each catalyst was screened to a 14/20-mesh material, i.e., a material that would pass through a 14-mesh (1.41-mm) screen (U.S. Sieve Series), but would be retained on a 20-mesh (0.85-mm) screen (U.S. Sieve Series).

Each of the above-described catalysts was tested for its ability to demetallize an Ardeshir vacuum resid feedstock, the properties of which are presented hereinbelow in Table III. This hydrocarbon feedstock is identified hereinafter as Feed No. 1.

Each test was carried out in a bench-scale test unit having automatic controls for pressure, flow of reactants, and temperature. The reactor was made from 0.953-cm (⅜-inch)-inside-diameter stainless-steel, heavy-walled tubing. A 0.318-cm (⅛-inch)-outside-diameter thermowell extended up through the center of the reactor. The reactor was heated by an electrically-heated steel block. The hydrocarbon feedstock was fed to the unit by means of a Ruska pump, a positive displacement pump. The 14/20-mesh catalyst material was supported on 8-to-10-mesh (2.38 mm-to-1.68 mm) alundum particles. Approximately 15 cubic centimeters of catalyst were employed as the catalyst bed in each test. This amount of catalyst provided a catalyst bed length of about 25.4 cm (10 in). A 25.4-cm (10-in) layer of 8-to-10-mesh (2.38 mm-to-1.68 mm) alundum particles was placed over the catalyst bed in the reactor for each test. The catalyst that was employed was located in the annular space between the thermowell and the internal wall of the 0.953-cm (⅜-in)-inside-diameter reactor.

Prior to its use, each catalyst was calcined in still air at a temperature of about 538° C. (1,000° F.) for 1 hour. It was subsequently cooled in a desiccator and loaded into the appropriate reactor.

The operating conditions for each of these demetallization tests were a total pressure of 12,500 kPa (1,800 psig), a temperature of 416° C. (780° F.), a LHSV of 1 cc of hydrocarbon per hr per cc of catalyst, and a hydrogen addition rate of 890 m³/m³ (5,000 SCFB) to 1,424 m³/m³ (8,000 SCFB).

TABLE III

FEEDSTOCK PROPERTIES

| Feed No. | 1 | 2 |
|---|---|---|
| Gravity, °API | 3.2 | 4.8 |
| Composition, wt % | | |
| Oils | 12.7 | 24.0 |
| Asphaltenes | 15.5 | 14.7 |
| Resins | 71.8 | 61.3 |
| Carbon residue, wt % | 27.8 | 25.6 |
| Carbon, wt % | 83.65 | 83.68 |
| Hydrogen, wt % | 9.73 | 9.88 |
| Nitrogen, wt % | 0.60 | 0.52 |
| Sulfur, wt % | 5.7 | 5.1 |
| Oxygen, wt % | 0.3 | — |
| Nickel, ppm (wt) | 72 | 63 |
| Vanadium, ppm (wt) | 262 | 227 |

Figure 2:
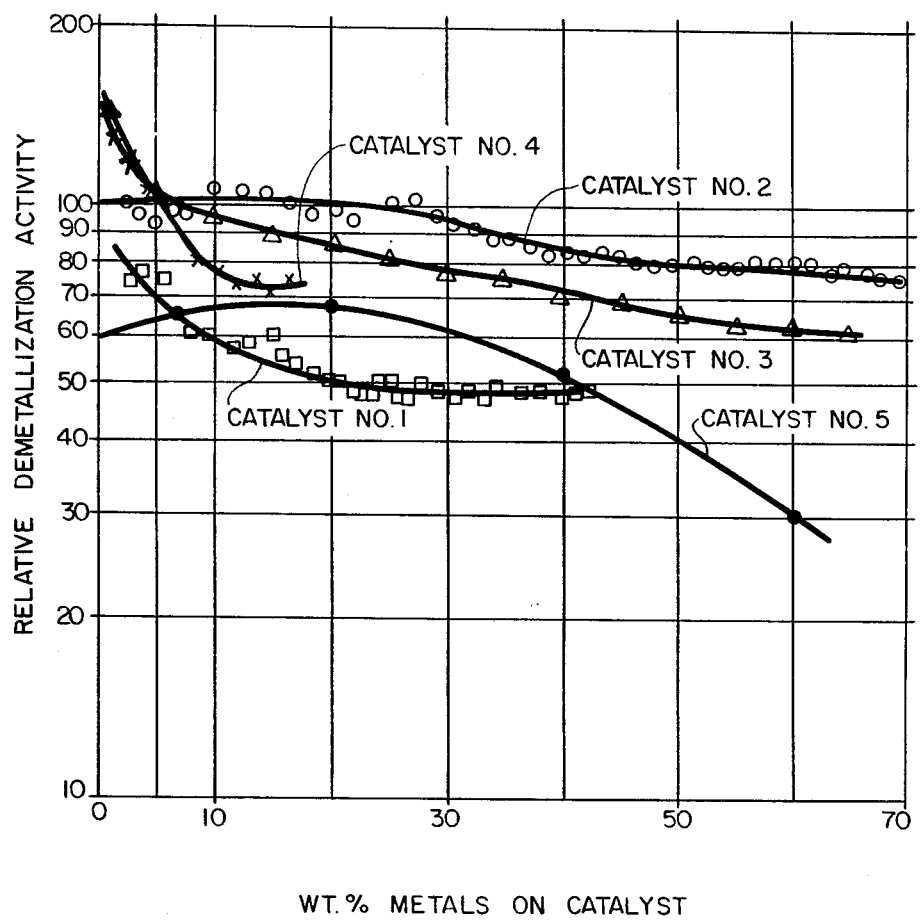

The results of the tests are presented in the accompanying FIG. 2. The relative demetallization activity of each catalyst is plotted against the wt% of metals (nickel and vanadium) that are retained on that particular catalyst. This relative activity is obtained by dividing the volume of the reference catalyst having an assigned activity value of 100 by the volume of the experimental catalyst that is needed to reduce the metals content of the feed to the same metals content when operating at constant temperature and pressure. The reference catalyst was Catalyst No. 2.

In the case of the test conducted with Catalyst No. 1, the first few days of the test were carried out with a second feed that was obtained from the same Ardeshir crude as Feed No. 1. The properties of this second feed, identified as Feed No. 2, are presented hereinabove in Table III. The first three data points for Catalyst No. 1 in FIG. 2, i.e., the three data points representing the three lowest amounts of metals on catalyst for Catalyst No. 1, were obtained with Feed No. 2 and, therefore, show only approximate demetallization activity.

The data demonstrate that the catalysts which have steamed supports comprising alumina and oxides of phosphorus, i.e., Catalysts Nos. 2 and 3, provided much better activity maintenance than the corresponding catalysts that had the untreated supports, Catalysts Nos. 1 and 4, respectively. Moreover, the prior art catalyst, namely, Catalyst No. 5, performed quite poorly.

EXAMPLE III

An embodiment of the process of the present invention wherein the catalyst is employed in the form of an ebullating bed was conducted in a relatively large multi-stage pilot plant. Only the first stage of the unit was employed for the performance of this test.

A large pilot plant batch of catalyst was obtained from the Katalco Corporation. This catalyst, which is identified hereinafter as Catalyst No. 6, was found to contain 4.0 wt% molybdenum trioxide, based upon the weight of the catalyst, supported on a support containing alumina and 8.7 wt% oxides of phosphorus, calculated as $P_2O_5$ and based upon the weight of the support.

A 6,500-cc portion of this catalyst in the form of 0.079-cm (1/32-in) extrudates was charged to the first stage of the pilot plant. Catalyst No. 6 had the properties presented hereinbelow in Table IV.

TABLE IV
PROPERTIES OF CATALYST NO. 6

| | |
|---|---|
| Total Pore Volume, cc/gm | 1.113 |
| Surface Area (BET), m$^2$/gm | 169 |
| Average Pore Diameter, nm | 26.3 |
| Å | 263 |
| % of P.V. in Pores of Diam. in nm (Å): | |
| 0–10 (0–100) | 13.3 |
| 10–20 (100–200) | 33.2 |
| 20–120 (200–1,200) | 41.7 |
| 120–5,000 (1,200–50,000) | 11.8 |

The test was conducted to show the ability of Catalyst No. 6 to demetallize a high-sulfur vacuum residual oil blend, which is identified hereinafter as Feed No. 3. The test was carried out at an inlet pressure of 2,000 psig (13,890 kPa), a catalyst bed temperature of 402° C. (756° F.), a LHSV of 0.6 cc of hydrocarbon per hour per cc of catalyst, and a hydrogen addition rate of about 712 m$^3$/m$^3$ (4,000 SCFB). Samples of product coming from the reactor section were obtained on the eighth day and the twenty-first day of operation. The temperature of operation on the eighth day was 402° C. (756° F.) while the temperature on the twenty-first day was 403° C. (757° F.) The other conditions remained the same. The results of this test are presented hereinbelow in Table V.

TABLE V
RESULTS OBTAINED WITH CATALYST NO. 6

| Properties | Feed No. 3 | Sample-Day 8 | Sample-Day 21 |
|---|---|---|---|
| Nickel, ppm | 56 | 27 | 32 |
| Vanadium, ppm | 229 | 64 | 83 |
| Sulfur, wt % | 3.9 | 2.3 | 1.8 |
| Gravity, °API | 7.3 | 10.4 | 13.0 |
| Rams Carbon, wt % | 20.7 | 12.8 | 13.6 |

The above data demonstrate that the embodiment of the process of the present invention wherein the catalyst is present as an ebullating bed effectively hydrometallizes a high-sulfur vacuum residual oil.

EXAMPLE IV

This example shows the performance of a catalyst having only a small amount of macropores, i.e., pores having diameters within the range of about 120 nm (1,200 Å) to about 5,000 nm (50,000 Å).

A commercial catalyst was obtained from the Katalco Corporation. This catalyst, which is identified hereinafter as Catalyst No. 7, possessed the composition and properties presented hereinbelow in Table VI.

TABLE VI
COMPOSITION AND PROPERTIES OF CATALYST NO. 7

| | |
|---|---|
| Composition, wt % | |
| $Al_2O_3$ | 84.0 |
| $P_2O_5$ | 8.5 |
| $MoO_3$ | 4.1 |
| $SiO_2$ | 1.3 |
| $Na_2O$ | 1.5 |
| $SO_4$— | 0.5 |
| Surface Area (BET), m$^2$/gm | 168 |
| Pore Volume, cc/gm | |
| 0–120 nm (N$_2$ adsorption) | 0.9815 |
| 120–5,000 nm (Hg penetration) | 0.0380 |
| Total | 1.0195 |
| Calc. A.P.D., nm | 24.3 |
| Å | 243 |
| % of P.V. in Pores of Diam. in nm (Å): | |
| 0–10 (0–100) | 15.3 |
| 10–20 (100–200) | 81.0 |
| 20–5,000 (200–50,000) | 3.7 |

As indicated in Table VI, Catalyst No. 7 does not contain a very large amount of macropores, i.e., pores having a diameter of 120 nm (1,200 Å) to 5,000 nm (50,000 Å).

Figure 3:
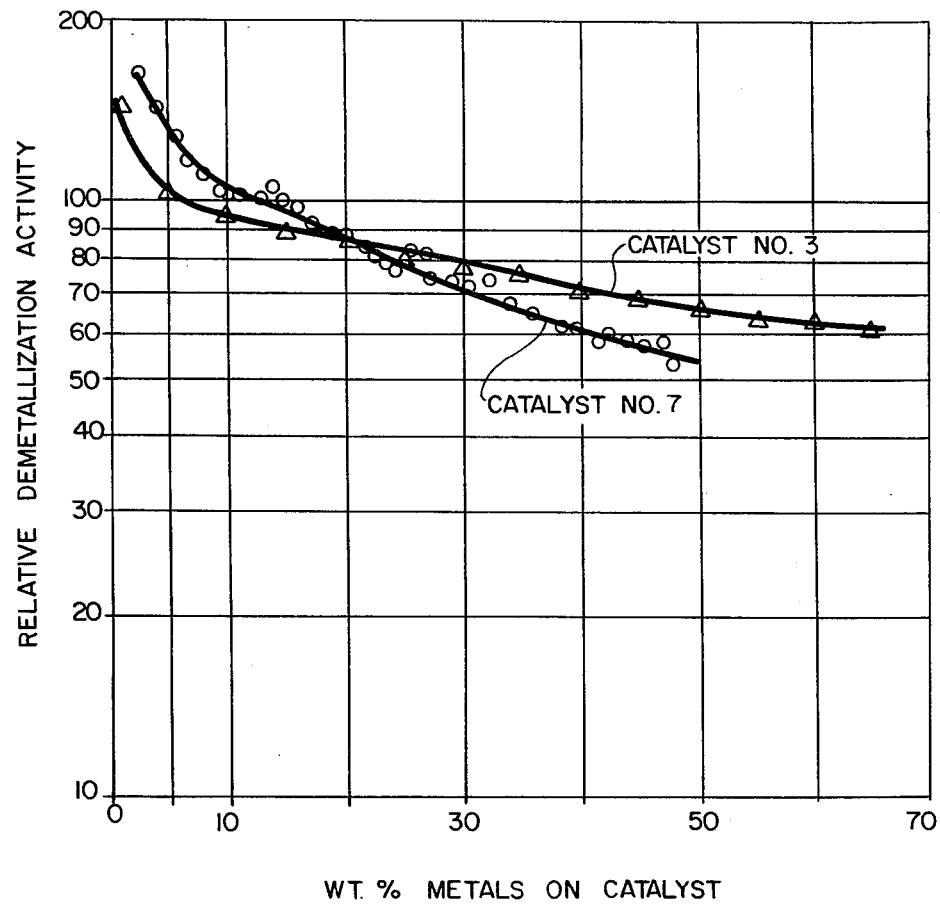

This catalyst was tested in Feed No. 1 as described hereinabove in Example II. The operating conditions for this test were similar to those employed in the tests of Example II. The results of this test are presented in the accompanying FIG. 3. Also shown in FIG. 3 are the results of the test described hereinabove with Catalyst No. 3. As shown in Table II, Catalyst No. 3, an embodiment of the catalyst of the present invention, had 17.3% of its pore volume in macropores.

FIG. 3 shows that Catalyst No. 7 had a higher rate of deactivation than did Catalyst No. 3. Hence, Catalyst No. 7, which had only 3.7% of its pore volume in macropores, performed in a manner that was inferior to that of Catalyst No. 3, an embodiment of the catalyst of the present invention. Catalyst No. 3 is an improved catalyst for the demetallization of heavy hydrocarbon streams containing a substantial amount of metals.

EXAMPLE V

In this Example, two catalyst supports having different contents of $P_2O_5$ were prepared and tested to show their ability to demetallize a heavy hydrocarbon stream. Each of these two catalyst supports was prepared in large-scale pilot plant equipment in the laboratory. The first of these supports, identified hereinafter as Catalyst Support No. 3, was prepared to contain about 20 wt% $P_2O_5$, while the second of these, identified hereinafter as Catalyst Support No. 4, was prepared to contain about 3 wt% $P_2O_5$.

Each of the catalyst supports was prepared as described hereinbelow. The amounts of components in the various solutions that were employed in the preparations are presented hereinbelow in Table VII. Each component was a commercial grade reagent.

TABLE VII
SOLUTION COMPONENTS FOR CATALYST SUPPORT PREPARATION

| Components | Cat. Support No. 3 | Cat. Support No. 4 |
|---|---|---|
| For Solution A: | | |
| $H_2O$ | 100 gal | 100 gal |
| 85% $H_3PO_4$ | 7.9 lb | 1.35 lb |
| NaOH | 6.22 lb | — |
| $Na_2O \cdot Al_2O_3 \cdot 3H_2O$ | 15.87 lb | 32.43 lb |
| For Solution B: | | |
| $H_2O$ | 44 gal | 44 gal |
| $Al_2(SO_4)_3 \cdot 14H_2O$ | 46.3 lb | 46.3 lb |
| conc $H_2SO_4$ | 146 cc | 146 cc |
| For Solution C: | | |
| $H_2O$ | 12 gal | 12 gal |
| $Na_2O \cdot Al_2O_3 \cdot 3H_2O$ | 18 lb | 18 lb |
| NaOH | 1.07 lb | 1.07 lb |

The various solutions needed for the preparation of Catalyst Support No. 3 were prepared according to Table VII. Solution B was added to Solution A at a rate of about 0.7 gal/min. The pH of the mixture was 4.10. Then Solution C was added to the mixture of Solution A and Solution B at a rate of about 0.5 gal/min. The pH of the resulting mixture was 9.21. The slurry was filtered and the resulting solid material was washed with a dilute ammonium hydroxide solution (5 ml of conc. $NH_4OH/l$) and distilled water. The ammonium hydroxide solution was prepared with tap water. The filtered product was collected and then re-slurried and stirred over the weekend at a moderate speed. Subsequently, the slurry was filtered, and spray dried to provide a fine-powdered material, which was then extruded into 0.159-cm (1/16-in) extrudates.

The extrudates were steam treated by contacting an 800-cc portion of the extrudates at a temperature of about 871° C. (1,600° F.) and a pressure of 1 atmosphere with a mixture of 98.4 vol% steam and 1.6 vol% nitrogen.

The various solutions that were required for the preparation of Catalyst Support No. 4 were composed of the ingredients listed in Table VII. Solution B was added to Solution A at a rate of 0.7 gal/min to provide a mixture having a pH of 4.91. Solution C was then added to the mixture of Solution A and Solution B at a rate of approximately 0.4 gal/min to provide a pH of 10.17. The resulting slurry was filtered, washed with dilute $NH_4OH$ solution and distilled water, re-slurried overnight, filtered, washed with a $NH_4OH$ solution and distilled water, filtered through a 40-mesh (0.35-mm) screen (U.S. Sieve Series), and spray dried to form finely-divided material. The finely-divided material was then extruded into 0.159-cm (1/16-in) extrudates.

A 700-cc portion of the extrudates of Catalyst Support No. 4 was steam treated similarly to the extrudates of Catalyst Support No. 3.

The properties of steamed and non-steamed Catalyst Supports Nos. 3 and 4 are presented hereinbelow in Table VIII.

TABLE VIII
COMPOSITION AND PROPERTIES OF SUPPORTS

| Catalyst Support No. | 3 | 3 | 4 | 4 |
|---|---|---|---|---|
| Steamed at 871° C. (1,600° F.) | | X | | X |
| Composition, wt % | | | | |
| $Al_2O_3$ | 80 | 80 | 97 | 97 |
| $P_2O_5$ | 20 | 20 | 3 | 3 |
| Surface Area (BET), $m^2$/gm | 157 | 115 | 301 | 190 |
| Pore Volume, cc/gm | | | | |
| 0–120 nm ($N_2$ adsorption) | 0.9941 | 0.7986 | 0.7834 | 0.7632 |
| 120–5,000 nm (Hg penetration) | 0.0231 | 0.0207 | 0.4099 | 0.4270 |
| Total | 0.9672 | 0.8193 | 1.1933 | 1.1902 |
| Calculated Avg. Pore Diameter, | | | | |
| nm | 24.6 | 28.5 | 15.8 | 25.0 |
| Å | 246 | 285 | 158 | 250 |
| Pore Size Distribution, % of Pore Volume Pore Diameter, nm (Å) | | | | |
| 0–10 (0–100) | 11.6 | 6.7 | 40.1 | 21.4 |
| 10–120 (100–1,200) | 86.0 | 90.8 | 25.5 | 42.7 |
| 120–5,000 (1,200–50,000) | 2.4 | 2.5 | 34.4 | 35.9 |

The average pore diameter increased significantly as a result of the steaming of either of these catalyst support materials, while the total pore volume of the catalyst support material did not change significantly. However, in the case of Catalyst Support No. 3, the total pore volume was reduced somewhat more than the total pore volume of Catalyst Support No. 4.

Since a requirement for the support materials of the present invention is that they have at least 0.8 cc/gm of their pore volumes in pores having diameters of 0 nm (0 Å) to 120 nm (1,200 Å), Catalyst Support No. 4, which has 0.7834 cc/gm of its pore volume in such pores, is probably at the lower limit of $P_2O_5$ content. On the other hand, at the 20% $P_2O_5$ level, Catalyst Support No. 3 shows some reduction in total pore volume and, therefore, may be at or just above the upper limit of $P_2O_5$ content. In any event, each of these supports exemplifies border-line embodiments.

In view of the above data, the catalyst of the present invention and the process of the present invention are suitable for the hydrodemetallization of heavy hydrocarbon streams.

What is claimed is:

1. A method for preparing an improved catalyst support from a composite comprising alumina and one or more oxides of phosphorus, which method comprises forming said composite into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å) and heating said shaped catalyst support material in the presence of steam at sufficient elevated temperature, steam pressure, and time period to increase the average pore diameter of said shaped catalyst support material in the absence of any appreciable reduction in pore volume, so as to provide a steam-treated support material having an average pore diameter of at least 18 nm (180 Å) and a surface area below 200 $m^2$/gm.

2. The method of claim 1, wherein said oxides of phosphorus are present in said composite in an amount within the range of about 5 wt% to about 20 wt%, calculated as $P_2O_5$ and based upon the weight of said composite.

3. The method of claim 2, wherein said temperature is within the range of about 704° C. (1,300° F.) to about 927° C. (1,700° F.).

4. The method of claim 2, wherein said steam is employed at a pressure within the range of about 30 kPa (4.4 psia) to about 274 kPa (25 psig).

5. The method of claim 3, wherein said steam is employed at a pressure within the range of about 30 kPa (4.4 psia) to about 274 kPa (25 psig).

6. A method for preparing a catalytic composition, which method comprises forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material, having an average pore diameter of at least 18 nm (180 Å) and a surface area below 200 m²/gm, and subsequently impregnating said steam-treated support material with at least one hydrogenating metal.

7. The method of claim 6, wherein said oxides of phosphorus are present in said composite in an amount within the range of about 5 wt% to about 20 wt%, calculated at $P_2O_5$ and based upon the weight of said composite.

8. The method of claim 7, wherein said temperature is within the range of about 704° C. (1,300° F.) to about 927° C. (1,700° F.).

9. The method of claim 7, wherein said steam is employed at a pressure within the range of about 30 kPa (4.4 psia) to about 274 kPa (25 psig).

10. The method of claim 7, wherein said hydrogenating metal is selected from the group consisting of vanadium, metals of Group VIB of the Periodic Table of Elements, and metals of Group VIII of the Periodic Table of Elements.

11. The method of claim 8, wherein said steam is employed at a pressure within the range of about 30 kPa (4.4 psia) to about 274 kPa (25 psig).

12. The method of claim 10, wherein said hydrogenating metal is molybdenum and is employed in an amount that will provide molybdenum in said composition within the range of about 0.5 wt% to about 20 wt%, calculated as $MoO_3$ and based upon the weight of said composition.

13. The method of claim 11, wherein said hydrogenating metal is selected from the group consisting of vanadium, metals of Group VIB of the Periodic Table of Elements, and metals of Group VIII of the Periodic Table of Elements.

14. The method of claim 13, wherein said hydrogenating metal is molybdenum and is employed in an amount that will provide molybdenum in said composition within the range of about 0.5 wt% to about 20 wt%, calculated as $MoO_3$ and based upon the weight of said composition.

15. A catalyst support which comprises an alumina and one or more oxides of phosphorus, said support having been prepared by the method which comprises forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), and heating said shaped catalyst support material in the presence of steam at sufficient elevated temperature, steam pressure, and time period to increase the average pore diameter of said shaped catalyst support material in the absence of any appreciable reduction in pore volume, so as to provide a steam-treated support material having an average pore diameter of at least 18 nm (180 Å) and a surface area below 200 m²/gm.

16. The catalyst support of claim 15, wherein said oxides of phosphorus are present in an amount within the range of about 5 wt% to about 20 wt%, calculated as $P_2O_5$ and based upon the weight of said support.

17. The catalyst support of claim 16, wherein said steam of said method is employed at a pressure within the range of about 30 kPa (4.4 psia) to about 274 kPa (25 psig).

18. The catalyst support of claim 16, wherein said temperature of said method is within the range of about 704° C. (1,300° F.) to about 927° C. (1,700° F.).

19. The catalyst support of claim 17, wherein said steam of said method is employed at a pressure within the range of about 30 kPa (4.4 psia) to about 274 kPa (25 psig).

20. A catalyst which comprises a hydrogenating component comprising at least one hydrogenating metal and a large-pore, high-surface area support comprising an alumina and one or more oxides of phosphorus, said at least one hydrogenating metal being present in the elemental form, as the oxide, as the sulfide, or mixtures thereof, said catalyst having been prepared by forming a composite comprising alumina and one or more oxides of phosphorus into a shaped catalyst support material having a selected shape and at least 0.8 cc/gm of its pore volume in pores having diameters of 0 nm (0 Å) to 120 nm (1,200 Å) and at least 0.1 cc/gm of its pore volume in pores having diameters of 120 nm (1,200 Å) to 5,000 nm (50,000 Å), heating said shaped catalyst support material in the presence of steam at sufficient elevated temperature, steam pressure, and time period to increase the average pore diameter of said shaped catalyst support material in the absence of any appreciable reduction in pore volume so as to provide a steam-treated support material having an average pore diameter of at least 18 nm (180 Å) and a surface area below 200 m²/gm, and subsequently impregnating said steam-treated support material with said at least one hydrogenating metal.

21. The catalyst of claim 20, wherein said at least one hydrogenating metal is selected from the group consisting of vanadium, metals of Group VIB of the Periodic Table of Elements, and metals of Group VIII of the Periodic Table of Elements.

22. The catalyst of claim 21, wherein said at least one hydrogenating metal is a metal of Group VIB of the Periodic Table of Elements.

23. The catalyst of claim 22, wherein said metal of Group VIB is molybdenum.

24. The catalyst of claim 23, wherein said molybdenum is present in an amount that is within the range of about 0.5 wt% to about 20 wt%, calculated as molybdenum trioxide and based upon the total catalyst weight, and said oxides of phosphorus are present in an amount that is within the range of about 5 wt% to about 20 wt%, calculated as $P_2O_5$ and based upon the weight of said support.

25. The catalyst of claim 24, wherein said molybdenum is present in an amount within the range of about 1 wt% to about 5 wt%, calculated as molybdenum trioxide and based upon the total catalyst weight.

26. The catalyst of claim 25, wherein said oxides of phosphorus are present in an amount within the range of about 6 wt% to about 11 wt%, calculated as $P_2O_5$ and based upon the weight of said support.

* * * * *

UNITED STATES PATENT OFFICE
CERTIFICATE OF CORRECTION

Patent No. 4,456,699              Dated June 26, 1984

Inventor(s) ALBERT L. HENSLEY, LEONARD M. Quick

It is certified that error appears in the above-identified patent and that said Letters Patent are hereby corrected as shown below:

Column 3, line 24 reads "compositions" should read --composition--

Column 14, line 8 "hydrometallization" should read --hydrodemetallization--

Column 16, line 47 "hereinbeflow" should read --hereinbelow--

Column 17, line 4 "obtaind" should read --obtained--

Column 17, line 45 "0.070" should read --0.079--

Column 17, line 55 "(0-100 521)" should read --(0-100 $\overset{\circ}{A}$)--

UNITED STATES PATENT OFFICE
CERTIFICATE OF CORRECTION

Patent No. 4,456,699        Dated June 26, 1984

Inventor(s) Albert L. Hensley, Leonard M. Quick

It is certified that error appears in the above-identified patent and that said Letters Patent are hereby corrected as shown below:

Column 20, lines 1-2 "hydrometallizes" should read --hydrodemetallizes--.

Column 23, line 28 "at" should read --as--.

Signed and Sealed this

First Day of January 1985

[SEAL]

Attest:

Attesting Officer

GERALD J. MOSSINGHOFF

Commissioner of Patents and Trademarks